US012732013B2

(12) United States Patent
Song et al.

(10) Patent No.: US 12,732,013 B2
(45) Date of Patent: Sep. 8, 2026

(54) METHOD, STORAGE MEDIUM AND APPARATUS FOR ADJUSTING CHARGING-DISCHARGING EFFICIENCY RATIO OF ENERGY STORAGE POWER STATION

(71) Applicant: Makesense Energy Technology Co., Limited, Shanghai (CN)

(72) Inventors: Pei Song, Shanghai (CN); Zhiyi Zhang, Shanghai (CN); Yanan Guo, Shanghai (CN); Danfei Gu, Shanghai (CN); Pingchao Hao, Shanghai (CN); Peng Ding, Shanghai (CN); Weikun Wu, Shanghai (CN); Guopeng Zhou, Shanghai (CN); Wenfu Wang, Shanghai (CN); Xiao Yan, Shanghai (CN); Enhai Zhao, Shanghai (CN); Xiaohua Chen, Shanghai (CN)

(73) Assignee: Makesense Energy Technology Co., Limited, Shanghai (CN)

( * ) Notice: Subject to any disclaimer, the term of this patent is extended or adjusted under 35 U.S.C. 154(b) by 735 days.

(21) Appl. No.: 18/139,406

(22) Filed: Apr. 26, 2023

(65) Prior Publication Data

US 2023/0361593 A1 Nov. 9, 2023

(30) Foreign Application Priority Data

May 9, 2022 (CN) ........................ 202210501409.6

(51) Int. Cl.
*H02J 7/96* (2026.01)
*H02J 7/61* (2026.01)
(Continued)

(52) U.S. Cl.
CPC ................. *H02J 7/96* (2026.01); *H02J 7/61* (2026.01); *H02J 7/63* (2026.01); *H02J 7/82* (2026.01)

(58) Field of Classification Search
CPC ........ H02J 7/96; H02J 7/61; H02J 7/63; H02J 7/82; H02J 7/04; H02J 7/40; H02J 7/80; H02J 7/865; Y02E 60/10
(Continued)

(56) References Cited

FOREIGN PATENT DOCUMENTS

| | | | | |
|---|---|---|---|---|
| CN | 114256929 A | * | 3/2022 | ................ H02J 7/96 |
| CN | 110323810 B | * | 4/2022 | .............. H02J 7/855 |

* cited by examiner

*Primary Examiner* — Julian D Huffman
*Assistant Examiner* — Aiman Bickiya
(74) *Attorney, Agent, or Firm* — troutman pepper locke; Tim Tingkang Xia, Esq.

(57) ABSTRACT

The invention provides method, apparatus and storage medium for adjusting the charging-discharging efficiency ratio of an energy storage power station. The method comprises before charging, determining theoretical charging electric quantity, theoretical charging average power, initial charging voltage and initial charging current; in the charging process, adjusting the current charging current by using a preset step length; responding to meeting the charging cutoff condition, ending the charging process, and recording the charging power, charging average power and actual charging time during the charging process; before discharging, determining theoretical discharging electric quantity, theoretical discharge average power and initial discharge current; in the discharging process, adjusting the current discharging current by using a preset step length; and responding to meeting the discharge cutoff condition, ending the discharge process, and recording the discharging electric quantity, the discharge average power and the actual discharge time duration during the discharge process.

6 Claims, 4 Drawing Sheets

(51) Int. Cl.
*H02J 7/63* (2026.01)
*H02J 7/82* (2026.01)

(58) Field of Classification Search
USPC .......................................................... 320/134
See application file for complete search history.

METHOD, STORAGE MEDIUM AND APPARATUS FOR ADJUSTING CHARGING-DISCHARGING EFFICIENCY RATIO OF ENERGY STORAGE POWER STATION

CROSS-REFERENCE TO RELATED PATENT APPLICATION

This application claims priority to and the benefit of Chinese Patent Application No. 202210501409.6, filed May 9, 2022, which are incorporated herein in their entireties by reference.

FIELD OF THE INVENTION

The invention relates generally to the technical field of power regulation of power stations, and particularly relates to a method, a storage medium and an apparatus for adjusting a charging-discharging efficiency ratio of an energy storage power station.

BACKGROUND OF THE INVENTION

At present, the application scenarios of energy storage power stations are divided into power generation side and user side. For the application scenarios on the user side, it is generally to cut peaks and fill valleys, and obtain income through the difference in electricity prices between peaks and valleys. Usually, when configuring the user-side energy storage power station, the charging and discharging powers and the charging cutoff adjustment and discharging cutoff conditions are configured according to the capacity of the power station and the power of the PCS (Power Conversion System, energy storage converter) equipped, and the time durations of the peaks and valleys.

At the operation initial stage of the power station, under the good condition of battery performance, the operation mode of regularly charging and discharging with the predetermined powers and time durations can satisfy the application demand to a certain extent, but as the time goes, the power station is ageing after a period of operations. Additionally, the temperature changes with the seasons, which may make the inside battery temperature of the power station unevenly distributed. All these can influence the charging and discharging efficiency of the battery. Meanwhile, the discharge at different temperatures and with different multiplying powers can result in very significant influence to the battery life. For different discharging powers, the loss of the high-power discharging electric quantity of the battery after a period of use is larger than that of the low-power discharging electric quantity (relative to a new battery), and the loss of the high-power discharging electric quantity at low temperature is larger than that of the medium-power discharging electric quantity. The operation conditions of the actual power station are more complicated, for example, a power outages for some reasons may shorten the charging or discharging time, which will eventually affect the income of the energy storage power station and the service life of the battery in the power station.

Therefore, there is unaddressed needs to provide a method for adjusting the charging-discharging efficiency ratio of an energy storage power station, a storage medium and an apparatus to solve deficiencies such as the inability to reasonably adjust the charging-discharging efficiency of an energy storage power station in the prior art.

SUMMARY OF THE INVENTION

In view of the above-noted drawbacks of the prior art, one of the objectives of this invention is to provide a method, a storage medium, and an apparatus for adjusting/regulating the charging-discharging efficiency ratio of an energy storage power station, which are used to solve the problem that the charging-discharging efficiency of the energy storage power station cannot be reasonably regulated in the prior art.

In order to achieve the above and other related objects, an aspect of the invention provides a method for adjusting a charge-discharge efficiency ratio of an energy storage power station. The method includes: before charging, determining a theoretical charging electric quantity, a theoretical charging average power, an initial charging voltage and an initial charging current; in the charging process, when the power determined according to the charging output voltage and the charging output current reaches the current charging power output condition, adjusting the current charging current by using a preset step length; responding to meeting the charging cutoff condition, ending the charging process, and recording the charging power, charging average power and actual charging time during the charging process; before discharging, determining a theoretical discharging electric quantity, a theoretical discharge average power and an initial discharge current; in the discharging process, when the power determined according to the discharging current reaches the current discharging power output condition, adjusting the current discharging current by using a preset step length; and responding to meeting the discharge cutoff condition, ending the discharge process, and recording the discharging electric quantity, the discharge average power and the actual discharge time duration during the discharge process.

In one embodiment, before the charging starts, the step of determining the theoretical charging electric quantity, the theoretical charging average power, the initial charging voltage, and the initial charging current includes: setting the theoretical charge $Qc=(Ep\times K1\times 100-SOC))/100$, where Ep represents the rated total energy of nthe power station, K1 represents the battery attenuation coefficient, and SOC represents the state of charge value; setting the theoretical charging average power $Pc=Qc/(H0\times K2)$, where Qc represents the theoretical charging electric quantity, H0 represents the valley time duration, and K2 represents the battery effective charging time coefficient; when the total voltage of the current batteries is smaller than the battery platform voltage, setting the initial charging voltage as the battery platform voltage, and setting the initial charging current as a first current; when the total voltage of the current batteries is greater than or equal to the battery platform voltage, setting the initial charging voltage as the full-charge voltage of the battery, setting the initial charging current as the ratio of the theoretical charging average power to the total voltage of the current batteries, and setting the first current to be smaller than the ratio.

In one embodiment, in the charging process, when the power determined according to the charging output voltage and the charging output current reaches the current charging power output condition, the step of adjusting the current charging current by using a preset step length includes: in the charging process, the initial current total voltage of the battery is smaller than the plateau voltage, and the charging voltage and the charging current are adjusted until the initial current total voltage of the battery reaches the plateau voltage; in the charging process, the highest single cell voltage change rate and the accumulated charging electric quantity from the current time period to the next time period are determined, and the adjustment direction of the charging power is determined according to the magnitude relation of the highest single cell voltage change rate.

In one embodiment, the step of determining the adjustment direction of the charging power according to the magnitude relation of the highest single cell voltage change rate includes: and if the highest single cell voltage change rate is greater than a first calibration value and does not reach the single charging protection voltage, adjusting the charging power in a reducing direction. And if the voltage change rate of the highest single-section battery cell is smaller than a second calibration value and the current charging power is smaller than the theoretical charging average power, adjusting the charging power in the increasing direction.

In one embodiment, the charging cutoff condition includes: a charging output stop judgment condition or a charging process end judgment condition; the charging output stop judgment condition refers to single cell voltage overcharge, charging set time or full battery charge; the charging process ending judgment condition is that the set charging time is expired or the immediate discharging condition being met.

In one embodiment, before the discharge starts, the step of determining the theoretical discharging electric quantity, the theoretical discharge average power, and the initial discharge current includes: setting the theoretical discharge average power $Pd=Qd/(H1\times K3)$; wherein Ep represents the rated total energy of the power station, K1 represents the battery attenuation coefficient, and SOC represents the state of charge value; setting the theoretical discharge average power $Pd=Qd/(H1\times K3)$; wherein Qd represents the theoretical discharging electric quantity, H1 represents the peak time period, and K3 represents the effective discharge time period coefficient of the battery; and setting the initial discharge current as the ratio of the theoretical discharge average power to the current total battery voltage.

In one embodiment, in the discharging process, when the power determined according to the discharging current reaches the current discharging power output condition, the step of adjusting the current discharging current by using a preset step length includes: in the discharging process, the lowest single cell voltage change rate and the accumulated discharging electric quantity from the current time period to the next time period are determined, and the adjusting direction of the discharging power is determined according to the size relation of the lowest single cell voltage change rate.

In one embodiment, the discharging cutoff condition includes a discharge output stop judgment condition or a discharge process end judgment condition. The discharge output stop judgment condition includes single cell voltage over-discharging, set discharging time being expired, or total battery voltage being lower than a normal allowable working voltage of the energy storage converter. The discharge process end judgment condition includes the set discharging time being expired, or the immediate charging condition being met.

To achieve the above and other related objects, another aspect of the invention relates to a non-transitory tangible computer-readable storage medium having a computer program stored thereon, where the computer program is executed by a processor to implement the method for adjusting the charge-discharge efficiency ratio of an energy storage power station.

To achieve the above and other related objects, a further aspect of the invention provides an apparatus adjusting a charge-discharge efficiency ratio of an energy storage power station. The apparatus comprises a processor and a memory; the memory is used for storing computer programs, and the processor is used for executing the computer programs stored by the memory, so that the adjusting device executes the method for adjusting the charge-discharge efficiency ratio of the energy storage power station.

As described above, the method for adjusting the charge-discharge efficiency ratio of the energy storage power station, the storage medium, and the apparatus according to the invention have at least the following advantages:

(1) the set regulating coefficients are adjusted to be three coefficients of the battery attenuation coefficient K1, the battery effective charging time coefficient K2 and the battery effective discharging time coefficient K3, so that the actual chargeable and dischargeable electric quantity of the battery can be regulated, the charging and discharging power can be dynamically regulated, and the peak clipping and valley filling maximum economic benefit is finally realized.

(2) During the charging or discharging process, the current working condition of the battery is reflected at the rate of voltage rising or voltage falling monitored in real time, and particularly at the end period of charging or discharging, the effective charging and the effective discharging of the battery are realized to the maximum extent through rapid feedback adjustment. According to the actual working condition of the power station operation, the charging or discharging power is dynamically fed back and adjusted, and the service life of the power station battery is prolonged.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

DETAILED DESCRIPTION OF THE INVENTION

Figure 1:
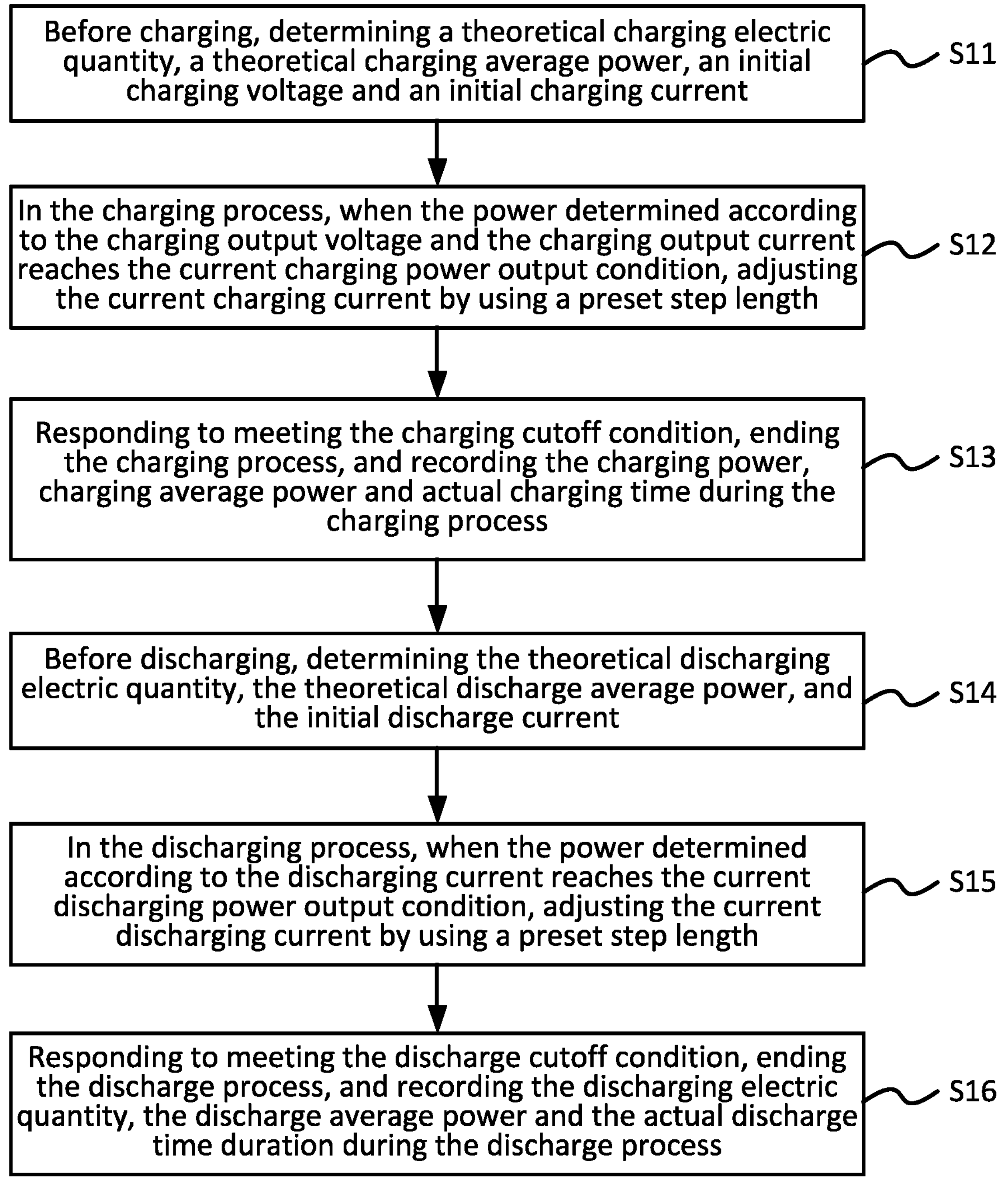
FIG. 1 is a schematic flow chart illustrating a method for adjusting a charging-discharging efficiency ratio of an energy storage power station according to one embodiment of the invention.

Embodiments of the invention are described below through specific examples in conjunction with the accompanying drawings in FIGS. 1-4, and those skilled in the art can easily understand other advantages and effects of the invention from the content disclosed in this specification.

The invention can also be implemented or applied through other different specific implementations, and various modifications or changes can be made to the details in this specification based on different viewpoints and applications without departing from the spirit of the invention. It should be noted that, in the case of no conflict, the following embodiments and features in the embodiments can be combined with each other.

It should be noted that the drawings provided in the following embodiments are merely illustrative in nature and serve to explain the principles of the invention, and are in no way intended to limit the invention, its application, or uses. Only the components related to the invention are shown in the drawings rather than the number, shape and size of the components in actual implementations. They do not represent the actual structure of the product. Dimensional drawing, the type, quantity and proportion of each component can be changed arbitrarily in its actual implementations. More complicate component layouts may also become apparent in view of the drawings, the specification, and the following claims.

The rated total energy of the power station is known as $E_{rated}$ with a unit of KWH, the actual total energy of the power station as $E_{actual}$, and E is actually influenced by factors such as the cycle number of the battery, the temperature of a battery pack body, the battery processing technology and the like.

In a practical application scenario of peak clipping and valley filling, within a given charging time, T1, the theoretical total charging energy of the power station $E_{charging}=P_{charging}\times T_{charging}$, wherein $P_{chargingr}=V_{charging}\times I_{charging}$, wherein $P_{charging}$, $T_{charging}$, $V_{charging}$, and $I_{charging}$ are the charging power, the charging time, the charging voltage and the charging current, respectively. In the actual charging process, the actual total charging energy is smaller than the theoretical total charging energy due to various factors such as over-charging protection of the battery. The actual total charging energy $E_{actualcharging}=P_{charging}\times T_{actualcharging}$, wherein $T_{actualcharging}$ is the actual charging time.

Within a given discharging time T2, the theoretical total discharging energy of the power station $E_{discharging}=P_{discharging}\times T_{discharging}$, wherein $P_{discharging}=V_{discharging}\times I_{discharging}$, $P_{discharging}$, $T_{discharging}$, $V_{discharging}$, and $I_{discharging}$ are the discharging power, the discharging time, the discharging voltage and the discharging current, respectively. In the actual discharging process, the discharging effect is greatly influenced by different discharging powers and temperatures during discharging. For example, the actual total discharging energy is smaller than the theoretical total discharging energy due to the fact that the battery can be deeply discharged, or the battery is over-discharged for protection, or the total voltage is reduced to the lowest working voltage of the PCS. The actual total discharging energy $E_{actualdischarging}=P_{discharging}\times T_{actualdischarging}$, wherein $T_{actualcharging}$ is the actual discharging time.

The more the battery is actually charged, the more it can discharge, and meanwhile, to achieve the maximum benefits of the peak clipping and valley filling, the ratio of the actual total charging energy to the actual total discharging energy, $E_{actualcharging}/E_{actualdischarging}$, is required be equal to 1 or less than 1.

In order to solve the problems and be suitable for matching the charge-discharge power and the discharge depth of the battery with the capacity under different working conditions, this invention provides a dynamic optimal charge-discharge power adjustment algorithm to achieve the optimal efficiency ratio of charge and discharge and the maximum benefits of the peak clipping and valley filling of the energy storage. The charging and discharging power is adjusted according to the current capacity performance and the real-time environment temperature of the battery, so that the battery capacity loss caused by charging and discharging of improper power is reduced, and the prolonging the service life of the battery is achieved.

The principle and implementation of the method, the storage medium and the apparatus device for adjusting the charging-discharging efficiency ratio of the energy storage power station according to the embodiments of the invention will be described in detail below with reference to FIGS. 1-4, so that those skilled in the art can understand the method, the storage medium and the apparatus for adjusting the charging-discharging efficiency ratio of the energy storage power station without creative work.

Referring to FIG. 1, a schematic flow chart of the method for adjusting a charging-discharging efficiency ratio of an energy storage power station according to an embodiment of the invention is shown. In this exemplary embodiment shown in FIG. 1, the method for adjusting the charge-discharge efficiency ratio of the energy storage power station specifically includes the following steps:

At step S11, before the charging starts, determining a theoretical charging electric quantity, a theoretical charging average power, an initial charging voltage and an initial charging current.

Figure 2:
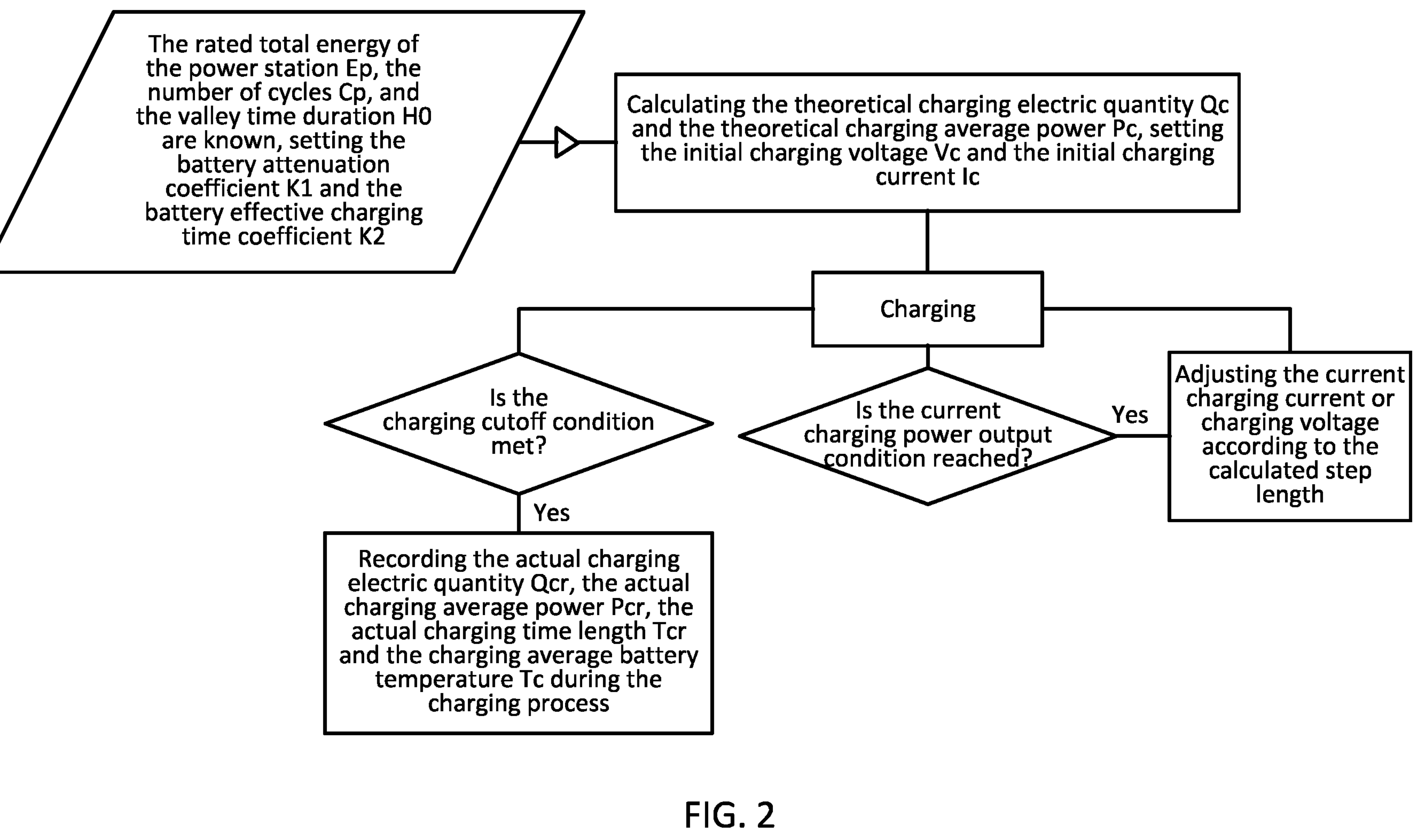
FIG. 2 is a charging flow chart illustrating a method for adjusting a charging-discharging efficiency ratio of an energy storage power station according to one embodiment of the invention.

In one embodiment, the calculated condition parameters are the rated total energy of the power station, Ep, in the unit of kilowatt-hour (KWH); the number of cycles, Cp; the valley time duration, H0, in the unit of hours (hour); the current battery SOC in the unit of %; and the current battery total voltage, Vo. For the battery attenuation coefficient, K1, the initialization value of K1 is set to be 1, and K1≤1. For the battery effective charging time coefficient, K2, the initialization value of K2 is set to be 1, K2≤1. Step S11 specifically includes the following steps:

(1) Setting the theoretical charging electric quantity Qc=(Ep×K1×(100−SOC))/100, wherein Ep represents a rated total energy of the energy storage power station, K1 represents a battery attenuation coefficient, and SOC represents a state of charge value. As shown in FIG. 2, the theoretical charging electric quantity Qc refers to a charging electric quantity predicted according to the formula of Qc=(Ep×K1×(100−SOC))/100.

(2) Setting the theoretical charging average power Pc=Qc/(H0×K2), wherein Qc represents the theoretical charging electric quantity, H0 represents a valley time duration, and K2 represents a battery effective charging time coefficient. As shown in FIG. 2, the theoretical charging average power Pc refers to the charging average power predicted according to the formula of Pc=Qc/(H0×K2).

(3) When the total voltage Vo of the current batteries is less than the battery platform voltage, the initial charging voltage Vc is set as the battery platform voltage, the initial charging current is set as a first current Ic, and the first current Ic is a small current. Specifically, when Vo is smaller than the plateau voltage, i.e., the total voltage of the batteries is lower, the charging voltage Vc is set to be the battery platform voltage, and the charging current Ic is generally 0.1 C for small current charging. It should be noted that the term "battery platform voltage" used herein refers to "battery plateau voltage".

(4) When the total voltage Vo of the current batteries is greater than or equal to the battery platform voltage, that is, the voltage Vo is normal or higher, the initial charging voltage Vc is set as a full-charge voltage of the battery, the initial charging current is set as a ratio of the theoretical charging average power to the total voltage of the current batteries, that is, Ic=Pc/Vo. The first current is less than the ratio.

At step S12, in the charging process, when the power determined according to the charging output voltage and the charging output current reaches the current charging power output condition, adjusting the current charging current by using a preset step length.

In one embodiment, step S12 specifically includes the following steps:

(1) In the charging process, when the initial total voltage Vo of the current batteries is smaller than the battery platform voltage and until the initial total voltage of the current batteries reaches the battery platform voltage, the charging voltage and the charging current are adjusted.

(2) In the charging process, the highest single cell voltage change rate Δdv0 and the accumulated charging electric quantity Qrc from the current time period t(n) to the next time period t(n+1) are determined, and the adjustment direction of the charging power is determined according to the magnitude relation of the highest single cell voltage change rate dv0.

In one embodiment, the step of determining the adjustment direction of the charging power according to the magnitude relation of the highest single cell voltage change rate includes: if the highest single cell voltage change rate is larger than a first calibration value and does not reach a single charging protection voltage, adjusting the charging power in a reducing direction; and if the highest single cell voltage change rate is smaller than a second calibration value and the current charging power is smaller than the theoretical charging average power, adjusting the charging power in the increasing direction.

Specifically, if Δdv0 is greater than the first calibration value $\alpha$ and the single charging protection voltage is not reached, the charging power needs to be adjusted in the decreasing direction, and the adjustment step size is $\beta$ (1−(Qrc/Qc)), where $\beta$ is a fixed parameter that is related to the minimum precision of the device hardware and usually is an integer times of the minimum precision, so as to ensure that the adjustment step size meets the requirement of the device. If Δdv0 is less than the second calibration value $\theta$ and the current charging power is less than the theoretical charging average power, the charging power needs to be adjusted in the increasing direction by a step size $\beta$ (1−(Qrc/Qc)), where $\beta$ is a fixed parameter. And repeating the step (2) until the charge cutoff condition is met.

At step S13, responding to meeting the charging cutoff condition, ending the charging process, and recording the charging electric quantity Qcr in the unit of kwh; the charging average power Pcr in the unit of kw; the actual charging time length Tcr is in hours; and the charging average temperature Tc of the battery during the charging process.

In one embodiment, the charging cutoff condition includes a charging output stop judgment condition or a charging process end judgment condition.

The charging output stop judgment condition refers to single cell voltage overcharging, set charging time being expired, or a full charge of a battery.

The charging process ending judgment condition is the set charging time being expired, or the immediate discharging condition being met.

At step S14, before the discharge starts, determining the theoretical discharging electric quantity Qd, the theoretical discharge average power Pd, and the initial discharge current Id.

In one embodiment, the calculated condition parameters are the rated total energy of the power station Ep in kilowatt-hours (kwh); the number of cycles Cp; the peak time duration H1 in hours (hours); the current battery SOC in %; the current total battery voltage V1; the last charged amount Qcr. For a cell attenuation coefficient K1, K1≤1. For a battery effective discharge time length coefficient K3, an initialization value of K3 is 1.

Figure 3:
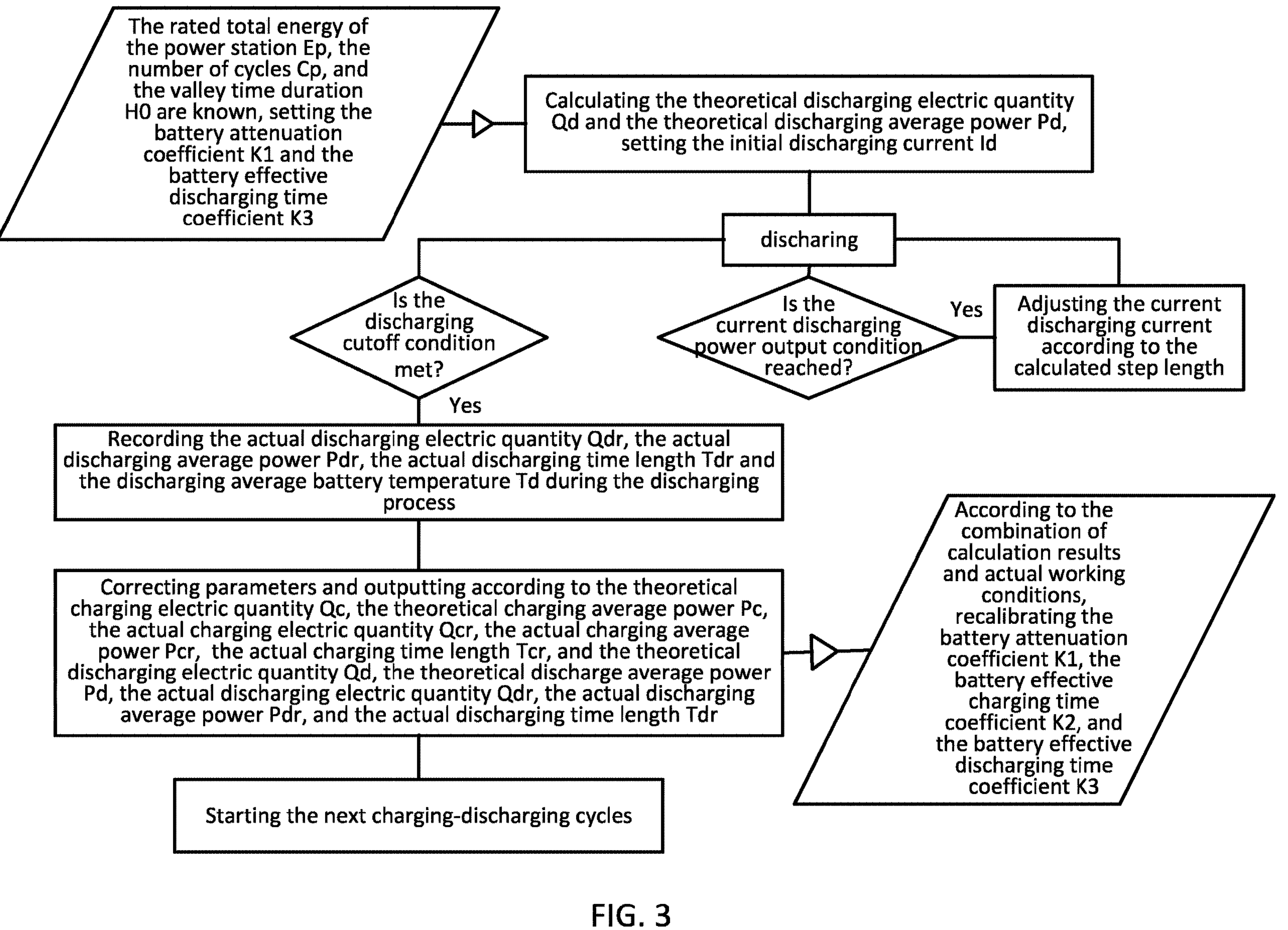
FIG. 3 is a discharge flow chart illustrating a method for adjusting a charging-discharging efficiency ratio of an energy storage power station according to one embodiment of the invention.

In one embodiment, step S14 of K3≤1 specifically comprises the following steps:

(1) Setting the theoretical discharging electric quantity Qd=(Ep×K1×SOC)/100; where Ep represents the rated total energy of the power station, K1 represents the battery attenuation coefficient, and SOC represents the state of charge value. As shown in FIG. 3, the theoretical discharging electric quantity Qd refers to a discharging electric quantity expected according to the formula of Qd=(Ep×K1×SOC)/100.

(2) Setting the theoretical discharge average power Pd=Qd/(H1×K3); where Qd represents the theoretical discharging electric quantity, H1 represents the peak time duration, and K3 represents the battery effective discharging time coefficient. As shown in FIG. 3, the theoretical discharge average power Pd refers to the discharge average power predicted according to the formula Pd=Qd/(H1×K3).

(3) Setting the initial discharge current Id as the ratio of the theoretical discharge average power Pd to the total voltage Vo, i.e. Id=Pd/Vo, of the current batteries.

At step S15, in the discharging process, when the power determined according to the discharging current reaches the current discharging power output condition, adjusting the current discharging current by using a preset step length.

In one embodiment, step S15 specifically includes the following steps: in the discharging process, the lowest single cell voltage change rate and the accumulated discharging electric quantity from the current time period to the next time period are determined, and the adjusting direction of the discharging power is determined according to the magnitude relation of the lowest single cell voltage change rate.

Specifically, in the discharging process, the lowest single cell voltage change rate Δdv1 in the time period from t(n) to t(n+1) is calculated, and the accumulated discharging electric quantity Qrd is calculated. If Δdv1 is greater than a certain calibration value $\alpha$ and does not reach the discharge protection voltage of the cell, the discharge power needs to be adjusted in the decreasing direction, and the adjustment step size is $\beta$ (1−(Qdc/Qd)), where $\beta$ is a fixed parameter that is related to the minimum precision of the device hardware and usually is an integer times of the minimum precision, so as to ensure that the adjustment step size meets the requirement of the device. If Δdv1 is less than a certain calibration value $\theta$, and the current discharge power is less than the theoretical average discharge power, the discharge power needs to be adjusted in the increasing direction by a step size $\beta$ (1−(Qrd/Qd)), where $\beta$ is a fixed parameter. Step S15 is repeated until the discharge cutoff condition is satisfied.

At step S16, responding to meeting the discharge cutoff condition, ending the discharge process, and recording the discharging electric quantity Qdr, the discharging average power Pdr and the actual discharging time Tdr during the discharging process.

In one embodiment, the discharging cutoff condition includes a discharge output stop judgment condition or a discharge process end judgment condition.

The discharge output stop judgment condition refers to that the single cell voltage is over-discharged, the set discharging time is expired or the total voltage of the battery is lower than the normal allowable working voltage of the energy storage converter.

The discharge process ending judgment condition is that the set discharging time is expired or the immediate charging condition is met.

Further, according to the test result, if the test result meets the condition of recalibrating the parameters, the battery attenuation coefficient K1, the battery effective charging time coefficient K2 and the battery effective discharging time length coefficient K3 are recalibrated. The recalibration condition is a complete charging and discharging process. Step S11 is repeated to start the next charge and discharge flow.

The scope of the method for adjusting the charging-discharging efficiency ratio of the energy storage power station is not limited to the execution sequence of the steps listed in the embodiment, and all the schemes of increasing, decreasing and replacing the steps in the prior art according to the principle of the invention are included in the protection scope of the invention.

In another aspect, the invention also provides a non-transitory tangible computer-readable storage medium on which a computer program is stored, the computer program, when executed by a processor, implementing method for adjusting the charge-discharge efficiency ratio of the energy storage power station.

Those of ordinary skill in the art will understand that all or part of the steps for implementing the above method embodiments may be performed by hardware associated with a computer program. The aforementioned computer program may be stored in a computer readable storage medium. When executed, the program performs steps comprising the method embodiments described above; and the aforementioned computer-readable storage media comprise: various computer storage media that can store program codes, such as ROM, RAM, magnetic or optical disks.

Figure 4:
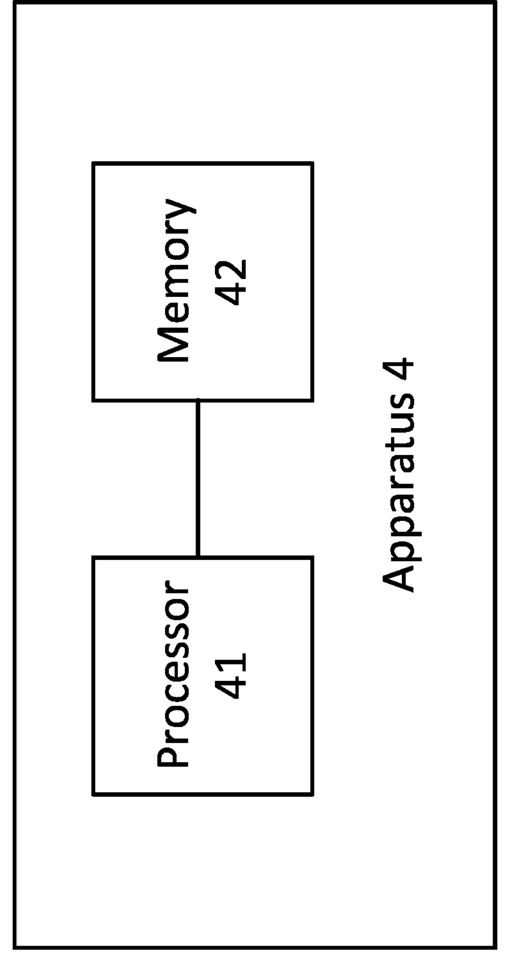
FIG. 4 is a schematic structural diagram of an apparatus for adjusting a charging-discharging efficiency ratio of an energy storage power station according to one embodiment of the invention.

Referring to FIG. 4 now, which is a schematic structural diagram of an apparatus for adjusting the charge-discharge efficiency ratio of the energy storage power station according to an embodiment of the invention. As shown in FIG. 4 in the exemplary embodiment, the apparatus 4 specifically includes a processor 41 and a memory 42; the memory 42 is configured to store a computer program, and the processor 41 is configured to execute the computer program stored in the memory 42, so that the apparatus 4 executes each step of the method for adjusting the charge-discharge efficiency ratio of the energy storage power station.

The processor 41 may be a general-purpose processor, and includes a central processing unit (CPU), a network processor (NP), and the like; the integrated circuit may also be a digital signal processor (DSP), an application specific integrated circuit (ASIC), a field programmable gate array (FPGA) or other programmable logic device, discrete gate or transistor logic device, discrete hardware component.

The memory 42 may include a random access memory (RAM), and may further include a non-volatile memory (non-volatile memory), such as at least one disk memory.

In summary, the method and apparatus for adjusting the charging-discharging efficiency ratio of the energy storage power station, and the storage medium can realize the adjustment of the actual chargeable and dischargeable capacity of the battery, dynamically adjust the charging and discharging power, and finally realize the maximum economic benefit of the peak clipping and valley filling by adjusting the set adjustment coefficients to be the three coefficients of the battery attenuation coefficient K1, the battery effective charging duration coefficient K2 and the battery effective discharging time coefficient K3. During the charging or discharging process, the current working condition of the battery is reflected at the rate of voltage rising or voltage falling monitored in real time, and particularly at the end period of charging or discharging, the effective charging and the effective discharging of the battery are realized to the maximum extent through rapid feedback adjustment. According to the actual working condition of the power station operation, the charging or discharging power is dynamically fed back and adjusted, and the service life of the power station battery is prolonged. The invention effectively overcomes various defects in the prior art and has high industrial utilization value.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A method for adjusting a charge-discharge efficiency ratio of an energy storage power station, comprising:

before charging, determining a theoretical charging electric quantity, a theoretical charging average power, an initial charging voltage and an initial charging current; setting the theoretical charging electric quantity $Qc=(Ep\times K1\times(100-SOC))/100$, wherein Ep represents a rated total energy of the energy storage power station, K1 represents a battery attenuation coefficient, and SOC represents a state of charge value; setting the theoretical charging average power $Pc=Qc/(H0\times K2)$, wherein H0 represents a valley time duration, and K2 represents a battery effective charging time coefficient; when a total voltage of current batteries is smaller than a battery platform voltage, setting the initial charging voltage as the battery platform voltage, and setting the initial charging current as a first current; when the total voltage of the current batteries is greater than or equal to the battery platform voltage, setting the initial charging voltage as a full-charge voltage of the batteries, setting the initial charging current as a ratio of the theoretical average charging power to the total voltage of the current batteries, wherein the first current is smaller than the ratio;

in a charging process, when a power determined according to a charging output voltage and a charging output current reaches a current charging power output condition, adjusting a current charging current by using a preset step length; in the charging process, when an initial total voltage of the current batteries is smaller than the battery platform voltage and until the initial total voltage of the current batteries reaches the battery platform voltage, the charging output voltage and the charging output current are adjusted; in the charging process, determining a highest single cell voltage change rate and an accumulated charging electric quantity from a current time period to a next time period, and determining an adjustment direction of a charging power according to a magnitude relation of the highest single cell voltage change rate; responding to meeting a charging cutoff condition, ending the charging process, and recording the charging power, a charging average power and an actual charging time during the charging process;

before discharging, determining a theoretical discharging electric quantity, a theoretical discharge average power and an initial discharge current; setting the theoretical discharging electric quantity Qd=(Ep×K1×SOC)/100; setting the theoretical discharge average power Pd=Qd/(H1×K3), wherein H1 represents a peak time duration, and K3 represents a battery effective discharge time duration coefficient; setting the initial discharge current as a ratio of the theoretical discharging average power to the total voltage of the current batteries; in a discharging process, when a power determined according to a current discharging current reaches a current discharging power output condition, adjusting the current discharging current by using a preset step length; in the discharging process, determining a lowest single cell voltage change rate and an accumulated discharging electric quantity from a current time period to a next time period, and determining an adjustment direction of the discharging power according to a magnitude relation of the lowest single cell voltage change rate; and responding to meeting the discharge a discharging cutoff condition, ending the discharge process, and recording a discharging electric quantity, a discharge average power and an actual discharge time duration during the discharge discharging process.

2. The method of claim 1, wherein the step of determining the adjustment direction of the charging power according to the magnitude relation of the highest single cell voltage change rate comprises:

if the highest single cell voltage change rate is larger than a first calibration value and does not reach a single charging protection voltage, adjusting the charging power in a reducing direction; and if the highest single cell voltage change rate is smaller than a second calibration value and the current charging power is smaller than the theoretical charging average power, adjusting the charging power in the increasing direction.

3. The method of claim 1, wherein the charging cutoff condition includes a charging output stop judgment condition or a charging process end judgment condition;

wherein the charging output stop judgment condition includes single cell voltage overcharging, set charging time being expired, or a full charge of a battery; and wherein the charging process end judgment condition includes the set charging time being expired, or the immediate discharging condition being met.

4. The method of claim 1, wherein the discharging cutoff condition includes a discharge output stop judgment condition or a discharge process end judgment condition;

wherein the discharge output stop judgment condition includes single cell voltage over-discharging, set discharging time being expired, or total battery voltage being lower than a normal allowable working voltage of the energy storage converter; and wherein the discharge process end judgment condition includes the set discharging time being expired, or the immediate charging condition being met.

5. A non-transitory tangible computer-readable medium storing computer program which, when executed by one or more processors, carries out the method for adjusting the charge-discharge efficiency ratio of the energy storage power station of claim 1.

6. An apparatus for adjusting a charge-discharge efficiency ratio of an energy storage power station, comprising:

a processor and a memory, wherein the memory is used for storing a computer program, and the processor is used for executing the computer program stored by the memory to cause the apparatus to execute the method for adjusting the charging-discharging efficiency ratio of the energy storage power station as claimed in claim 1.

* * * * *